US005782584A

United States Patent [19]
Arthur

[11] Patent Number: 5,782,584
[45] Date of Patent: Jul. 21, 1998

[54] ROCK UTILITY ENCLOSURE APPARATUS

[76] Inventor: Joel C. Arthur, 4303 N. Webster Ave., Perris, Calif. 92571

[21] Appl. No.: 728,893

[22] Filed: Oct. 10, 1996

[51] Int. Cl.⁶ .................. E02D 00/00; F16L 1/00
[52] U.S. Cl. .......... 405/303; 52/21; D11/143; 220/908; 264/262; 405/154; 405/157
[58] Field of Search .............. 405/52, 303, 128, 405/129, 154, 157; 52/21, 20, 19; 220/908; 404/25, 26; D11/143; 264/262; 47/58.5, 83; 174/38, 45

[56] References Cited

U.S. PATENT DOCUMENTS

| | | |
|---|---|---|
| D. 300,679 | 4/1989 | Draper . |
| 443,992 | 1/1891 | Hart ................................. 52/21 |
| 1,136,235 | 4/1915 | Jones ............................ 220/908 X |
| 1,424,520 | 8/1922 | Richardson et al. ........... 220/908 X |
| 1,617,555 | 2/1927 | Vallentin ........................ 52/20 X |
| 1,689,418 | 10/1928 | Young ........................ D11/143 X |
| 3,170,587 | 2/1965 | Beeber ........................ 220/908 X |
| 3,263,378 | 8/1966 | Dorris .......................... 404/25 X |
| 3,401,074 | 9/1968 | Takenouchi . |
| 3,647,102 | 3/1972 | Cooley ......................... 220/908 X |
| 3,928,712 | 12/1975 | Sears . |
| 4,009,545 | 3/1977 | Rossborough ................... 52/20 X |
| 4,021,131 | 5/1977 | Bakken et al. . |
| 4,385,088 | 5/1983 | Baskin . |
| 4,531,635 | 7/1985 | Cleveland . |
| 4,847,026 | 7/1989 | Jarboe et al. . |
| 5,032,197 | 7/1991 | Trimble ....................... 264/262 X |
| 5,443,774 | 8/1995 | Kluh et al. . |

*Primary Examiner*—Dennis L. Taylor
*Attorney, Agent, or Firm*—Knobbe, Martens, Olson & Bear, LLP

[57] ABSTRACT

A utility enclosure apparatus for utility lines extending upward from the ground consists of a housing defining a cavity and an upper aperture opening into the cavity as well as a lower aperture for the passage of utility cables into the cavity. Two rails extend upward from the housing and support a hanger rod therebetween that is slidable along the lengths of the rails. An amplifier or other device may be hung from the hanger rod for connection to the utility cables. An adjustable center support bar extends across the upper aperture in the housing to provide support to the amplifier or other device hanging from the rail. A rock-like cover is configure to fit over and conceal the housing and be removably secured to the housing so as to provide an aesthetic look to the utility enclosure.

21 Claims, 3 Drawing Sheets

ROCK UTILITY ENCLOSURE APPARATUS

BACKGROUND OF THE INVENTION

1. Field of the Invention

The present invention relates to a cover apparatus for a utility enclosure and, in particular, relates to a ventilated cover for a utility enclosure that has a rock-like appearance so as to be aesthetically pleasing to the eye.

2. Description of the Related Art

Increasingly, modern utility lines, such as telephone, electrical, and cable lines, are located underground, rather than in the air suspended by telephone poles, as in the past. While locating utility lines underground provides the advantage of removing unsightly telephone poles and suspended wires from city streets and rural landscapes, it also presents several disadvantages. Specifically, access to these underground lines is difficult and requires that these lines be periodically brought to the surface and enclosed within a surface enclosure. Consequently, utility companies have located utility enclosures at various above-ground or ground level locations. However, these enclosures are often unsightly, particularly when located in suburban neighborhoods and the like.

These utility enclosures do have certain advantages. For instance, they give utility workers the ability to perform maintenance on the lines, as well as the ability to diagnose or enhance the performance of the lines using active and passive devices that are attached to the utility lines in the enclosure. An above-ground enclosure provides easy access for changing these devices or otherwise upgrading or providing maintenance on these utility services. For example, above-ground utility enclosures facilitate the task of attaching amplifiers, or line extenders, or the like to cable TV lines. In this instance, the amplifiers act to boost the signal that is transmitted through the line.

Unfortunately, there are also certain drawbacks associated with current utility enclosures. First, the utility enclosures are unattractive in appearance as they typically consist of large box-shaped structures made of unattractive colors. Such devices are especially undesirable in residential areas, where the utility connectors often project upward in the yard of a home and spoil an otherwise well-landscaped yard. The utility enclosures and connectors contained therein also present another disadvantage in that their current design is impractical. As discussed, amplifiers and other devices are often located in the enclosures where connections are formed in the utility lines to boost the signal carried by the lines. Typically, these types of devices are suspended from an elevated bar that extends upward from the utility connector housing. However, in current utility connectors, the position of the elevated bar from which these devices are hung is fixed. This is undesirable, as it does not allow an operator to adjust the location of the bar to suit the various types and sizes of amplifiers or other devices. Moreover, because the position of the bar is fixed, it often gets in the way of a maintenance person who is trying to access the utility lines.

Hence, there is a need for a utility connector that is more aesthetically pleasing, as well as more practical and convenient for utility maintenance personnel to access for maintenance of the utility services provided therein.

SUMMARY OF THE INVENTION

The aforementioned needs are satisfied by the present invention, which is comprised of a utility connector enclosure apparatus that is both aesthetically pleasing and designed to provide utility maintenance personnel with convenient and easy access to the utility lines. In one aspect, the utility connector enclosure comprises a housing that defines a cavity and an upper opening to the cavity. The cavity can house one or more utility lines that preferably protrude upward from the ground through a lower aperture into the housing. Two guide rails extend upward from the housing and extend over the cavity. One or more hanger rods are suspended between the guide rails so that it is located over the cavity. The hanger rod is configured so that devices such as amplifiers may be hung from the rod and attached to the utility lines.

In another aspect of the invention, the hanger rod is slidably movable along the lengths of the guide rails. The guide rails are preferably arc-shaped to enhance the slidability of the rod over the rails and also to increase the range of motion of the hanger rod over the rails to accommodate devices of different sizes and shapes. In particular, the hanger rods are, therefore, adjustable which is advantageous as it allows maintenance personnel to adjust the position of the hanger rod to provide easier access to the cavity within the housing, and hence the utility lines, during maintenance or repair. Moreover, it also allows maintenance personnel to adjust the position of the rod to suit various sizes of amplifiers or other devices that are hung from the rod.

In another aspect of the invention, a center support bar extends across the upper aperture of the housing. The center bar acts to support the weight of an amplifier or other device that is hanging from the hanger rod. Preferably, the position of the center support bar is adjustable. This provides the ability for maintenance personnel to move the support bar to convenient positions during maintenance so as to provide maximum access to the cavity and the utility lines and also to provide optimum use of space and positioning within the enclosure.

In another aspect of the invention, a cover is configured to be removably secured over the housing so as to conceal the housing, and hence the utility connectors, from view. Preferably, the cover has a texture and color that appears like a rock. When the cover is in place, the utility enclosure appears as an attractive rock, rather than an intrusive-looking plastic device. This feature will preferably lessen a homeowner's resistance to having a utility connector located in his or her yard. Preferably, the cover is configured so that it may locked in place over the housing, thereby securing the utility lines from vandalism or theft.

Hence, the present invention is a utility connector apparatus that provides many advantages over the prior art. The device is an aesthetic housing for utility connectors that provides easy and convenient access for utility personnel to utility lines. These and other objects and advantages will become more fully apparent from the following description taken in conjunction with the accompanying drawings.

BRIEF DESCRIPTION OF THE DRAWINGS

These and other features of the invention will now be described with reference to the drawings of a preferred embodiment which is intended to illustrate and not to limit the invention, and in which.

DETAILED DESCRIPTION OF THE PREFERRED EMBODIMENT

Figure 1:
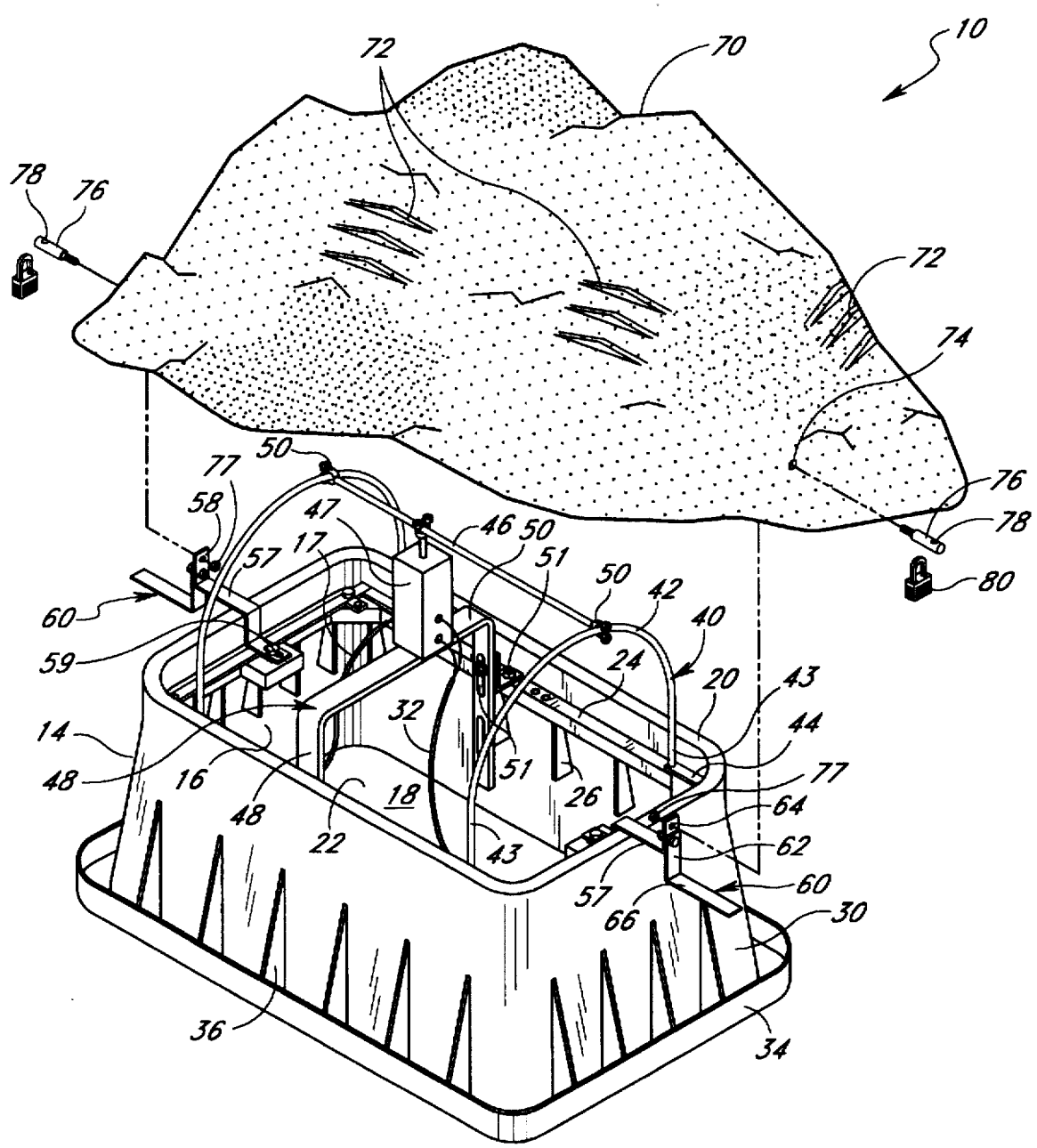
FIG. 1 is a perspective view of a preferred embodiment of the present invention.

Reference will now be made to the drawings wherein like numerals refer to like parts throughout. FIG. 1 is a perspective view of a rock utility cover apparatus 10. A support structure 12 of the rock utility cover apparatus 10 consists of a generally rectangular-shaped housing 14 having interior walls 16 that define a cavity 18 therein. In this embodiment, the housing 14 defines a generally rectangular-shaped cross section in a horizontal plane. The cross-section preferably tapers in size in the vertical direction so that the cross-sectional area is greater at the bottom of the housing 14. It will be appreciated that although a rectangular-shaped housing has been illustrated in FIG. 1, any wide variety of shapes could be utilized without departing from the scope of the invention.

An upper portion 20 of the rectangular-shaped housing 14 defines a generally rectangular-shaped upper aperture 22 that opens into the cavity 18. Below the upper aperture 22, a flange 24 extends outward from the interior wall 16 around the entire perimeter of the housing 14. In the illustrated embodiment, a series of flange supports 26 are located immediately beneath the flange 24 around the perimeter of the housing 14 to provide vertical support for the flange 24.

A lower portion 30 of the rectangular shaped housing 14 defines a generally rectangular-shaped lower aperture 32 that opens into a lower end of the cavity 18. As discussed, the housing 14 tapers in size in the vertical direction so that the lower aperture 32 has a greater area than the upper aperture 22. Utility lines 17 may extend upward from the ground (See, FIG. 3) through the lower aperture 32 and into the cavity 18, where the lines may be maintained or connected to devices.

A base 34 is integrally formed with the lower portion 30 of the housing 14 so as to extend outward around the entire perimeter of the lower portion 30 of the housing 14. In the illustrated embodiment, the base 34 is shaped to extend horizontally outward and vertically upward. A series of triangular-shaped, vertical structural supports 36 are distributed around the exterior of the housing 14 to preferably provide structural rigidity to the housing 14.

With reference to the embodiment illustrated in FIG. 1, the housing 14 has dimensions of 32¼"×19½" at the upper aperture 22 and a depth of 15" from the upper aperture 22 to the lower aperture 32. In another embodiment, the housing 14 has dimensions of 26"×16 ½" at the upper aperture 22 and a depth of 15" from the upper aperture 22 to the lower aperture 32. However, it will be appreciated that the dimensions of the housing 14 may be varied without departing from the scope of the invention. The housing 14 is preferably constructed of a material that is rigid. Although metal may be utilized, the housing 14 is preferably constructed of plastic so as to reduce its overall weight.

Preferably, the housing 14 is designed to be positioned on the ground in a location where underground utility lines, such as power lines, telephone lines or cable TV lines extend upward towards the surface. Typically, the housing 14 is located adjacent structures that are to receive the utility service or are located at periodic intervals along the service line. For example, with cable TV service, the cables are buried under the ground and are periodically brought up into an enclosure 14 where the cables are fed through an amplifier. The amplifier then amplifies the signals carried by the cable and provides the amplified signal to the next run of buried cable. In this fashion, the cable can be extended over large distances without significant attenuation of the signals carried by the cable. It will be appreciated that there are many other types of buried underground service lines and cables that must be brought up to the surface for termination, connection or servicing and it will become apparent from the following description that the enclosure of the preferred embodiment can be used in any of a number of different implementations.

As shown in FIG. 1, two curved guide rods 40 are located at each of the opposite ends of the housing 14. The guide rods 40 each have a curved portion 42 that forms an arc that extends upward from the cavity 18. The curved portion 42 forms into two straight, parallel side portions 43. Flat bases 44 at each end of the side portions 43 of the guide rods 40 are configured to rest on the flange 24. Preferably, apertures extend through the flat bases 44 of the guide rods 40 for the receipt of a screw or some other fastening means that is used to secure the guide rods 40 to the flange 24. In this manner, the flange 24 supports the guide rods 40 so that the guide rods 40 extend upward through the upper aperture 22 and above the housing 14, thereby defining two parallel planes that are spaced apart by a distance substantially equal to the length of the housing 14. In FIG. 1, the guide rods 40 are positioned at the extreme opposite ends of the housing 14. However, it is envisioned that the guide rods 40 could be mounted anywhere along the flange 24, provided mounting holes are positioned at appropriate locations on the flange 24, so as to be positioned anywhere along the length of the housing 14. Further, additional guide rods 40 can also be mounted on the flange 24 if so desired.

A hanger rod 46 having ends 50 extends lengthwise across the housing 14 between each of the curve guide rods 40. The hanger rod 46 preferably has a length that corresponds to the distance between the two curved guide rods 40. The ends 50 of the hanger rod 46 are forked so as to define a u-shaped structure and the ends 50 are preferably threaded. Preferably, the u-shaped ends 50 each define a space that is sized to receive the curved guide rods 40 therein. Hence, in an assembled state, the hanger rod 46 is positioned between each of the guide rods 40 so that the guide rods 40 lie within the u-shaped ends 50 of the hanger rod 46. As the ends 50 are threaded, a nut or other clamping means may be utilized to tightly secure the u-shaped ends 50 of the hanger rod 46 to the guide rods 40, thereby suspending the hanger rod 46 above the cavity 18.

Figure 2:
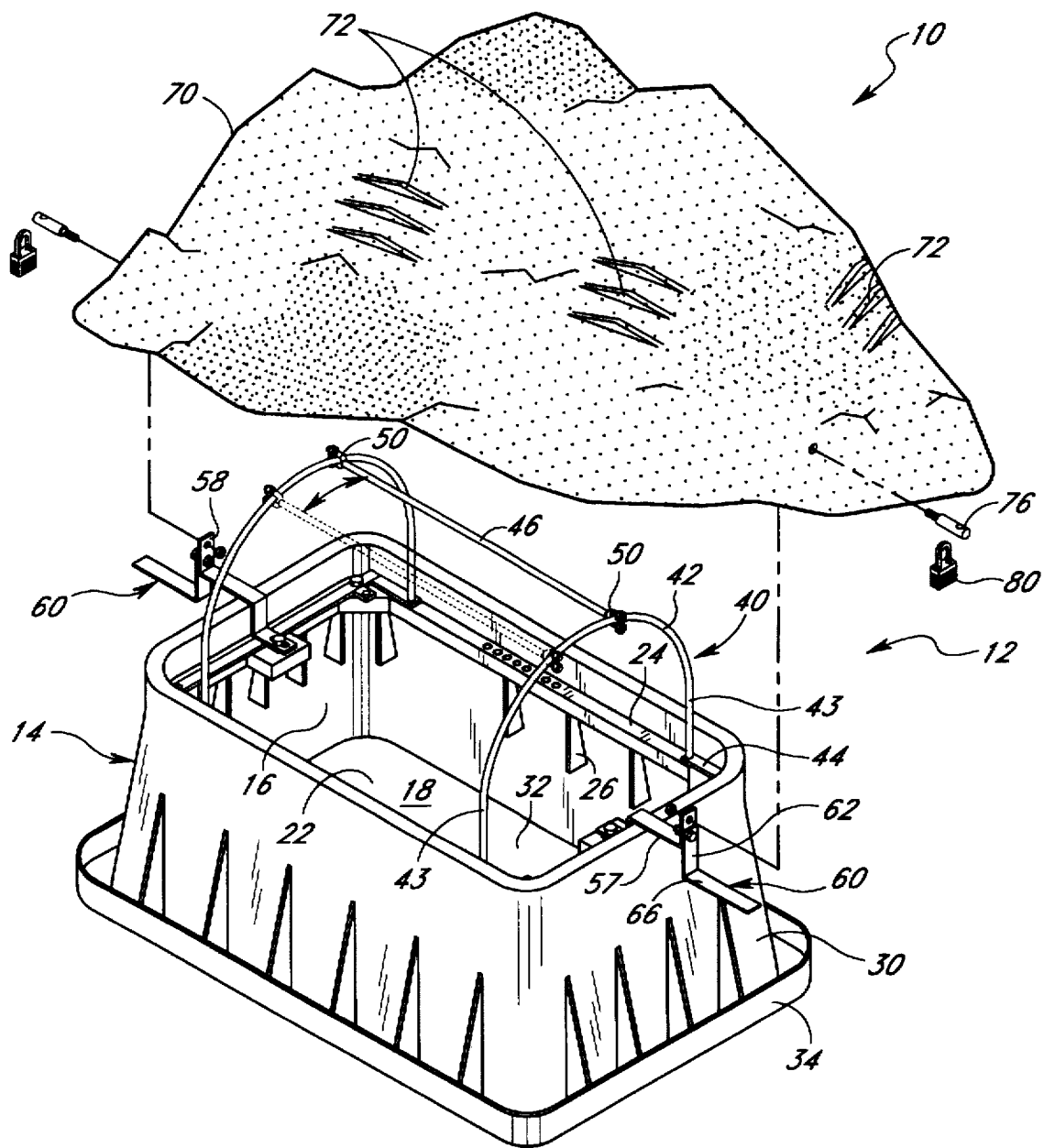
FIG. 2 is a perspective view of the device of FIG. 1 showing the hanger bar in an adjusted position.

With reference to FIG. 2, the hanger rod 46 may be moved by un-tightening the ends 50 of the hanger rod 46 and sliding the ends 50 along the length of the guide rods 40, as illustrated by the arrows in FIG. 2 and the hanger rod 46' shown in phantom. This is advantageous, as it permits a user to move the hanger rod 46 to various positions that are determined by the shape and length of the guide rods 40, as described in detail below. It will be appreciated that although, as illustrated, the guide rods 40 are arc-shaped, a variety of guide rod shapes and lengths may be utilized without departing from the scope of the invention.

Because the u-shaped ends 50 of the hanger rod 46 slide along the length of the guide rods 40, it is desirable that the guide rods 40 have circular cross-sections to provide for easier sliding with less resistance. However, cross sections of various shapes may be utilized so as to provide a secure fit between the ends 50 of the hanger rod 46 and the guide rods 40.

With reference to FIG. 1, the hanger rod 46 serves as a support for a device such as a cable TV amplifier 47 (illustrated schematically) or some other maintenance or diagnosis device known to those skilled in the art. In particular, the device 47 may consist of a cable TV amplifier that is designed to be hung from the center support 46 in the manner shown. The amplifier 47 is thus configured to hang from the hanger rod 46 so that it extends downward from the hanger rod 46 towards the upper aperture 22. The underground cables 17 can then be connected to the amplifier in a well known manner.

A center support 48 can also be located along the top portion 20 of the housing 14 so that it extends across the upper aperture 22 in a direction transverse to the length of the support rod 46. The center support 48 consists of two vertical sections 49 connected by a horizontal section 50. Slots 51 extend along the length of the vertical sections 49 of the center support 48. Mounts 52 are slidably fastened to the vertical sections 49 of the center support 48 using nuts and bolts that extend through the mounts 52 and through the slots 51. The mounts 52 are mounted to the flange 24 with self-mounting screws, thereby securing the center support 48 across the aperture. The mounts 52 may be tightened to the center support 48 at any point along the length of the slots 51, thus allowing the vertical position of the center mount 48 to be adjusted by un-tightening the mounts 52 and sliding the mounts 52 along the slots 51 to a desired position. Furthermore, the center support 48 may be positioned at any point along the length of the flange 24 using the self-mounting screws.

The center support 48 functions to partially support the weight of the device 47 that hangs from the hanger rod 46. The center support 48 may be positioned so that the amplifier 47 hangs straight down and rests directly above the center support 48, as illustrated in FIG. 1. Alternatively, for larger amplifiers or other devices that extend farther downward, the center support 48 may be positioned so that an amplifier rests diagonally against the center support 48 and into the cavity 18. Further, additional center supports 48 can be added as needed to support devices hanging from the rod 46. As the position of the center support 48 is adjustable, it advantageously allows maintenance personnel the ability to move it to convenient locations during maintenance of utility lines.

The above-described structures provide certain advantages over prior art utility enclosures. First, the adjustable hanger rod 46 enhances the convenience of the utility connector enclosure, as it permits utility maintenance personnel to move the hanger rod 46 to desired positions that improve access to the cavity 18 during maintenance, or to positions that are particularly suited for amplifiers or other devices of different sizes and configurations. Moreover, as the position of the hanger rod 46 is adjustable, rather than fixed, there is also provided the capability of positioning multiple hanger rods along the guide rods 40 if the need arises. As discussed, the adjustable center support 48 provides the advantage of being able to move the position of the center support 48 to positions that maximize the amount of support to the weight of a hanging amplifier, thereby reducing wear to the hanger rod 46. Furthermore, because its position is adjustable, maintenance personnel may move the center support 48 out of the way during maintenance.

As shown in FIGS. 1 and 2, extenders 57 are located at opposite ends of the housing 14, preferably near the center point of the width of the housing at each end. Each extender 57 consists of a strap of rigid material having a bent shape. The extenders 57 are fastened at one end to the flange 24, just below the aperture 22. The extenders 57 are shaped to extend horizontally along the flange 24 to the interior vertical wall 16 of the housing 14 and upward along the interior wall 16 so that they pass through and extend outward from the upper aperture 22. Preferably, a slot 59 extends through the extender 57 where the extender contacts the flange 24 so that the position of the extender may be adjusted along the length of the slot 59. At the upper end 20 of the housing 14, the extenders 57 protrude horizontally outward from the housing 14 along a plane defined by the upper aperture 22 and terminate in an upwardly extending outer end 58. At least one aperture 64 is located on each of the upwardly extending outer ends 58 of the extenders 57.

Alignment strips 60 are fastened to each of the outer ends 58 of the extenders 57. Alternatively, the alignment strips 60 may be integrally formed with the connector 57. In any event, the alignment strip 60 consists of an L-shaped strip of rigid material, such as plastic or metal. A vertical portion 62 of the alignment strip 60 is fastened to the outer end 58 of the extender 57. A horizontal portion 66 of the alignment strip 60 extends from the bottom end of the vertical portion 62 in a direction away from the housing 14. The horizontal portions of the alignment strip are preferably vertically aligned below the apertures 64. Preferably, each of the horizontal portions 66 of the alignment strips 60 define a common horizontal plane. The function of the alignment strips 60 is described below.

A cover 70 is configured to fit over the housing 14 so that the cover 70 may be positioned to conceal the housing 14 from view. Preferably, the cover 70 has an outer surface that is shaped and colored to simulate the appearance of a rock. A series of vents 72 are distributed on the cover 70 to provide ventilation to the housing 14 when the cover 70 is placed over the housing. In the illustrated embodiment, horizontal vents are arranged in sets of three periodically around the surface of the cover 70. Preferably, the vents may also act as handholds to facilitate lifting the cover 70. However, it will be appreciated that vents of various shapes could be distributed in any variety of aesthetically-pleasing or functional positions around the cover 70. It will be appreciated that when utility equipment is positioned in the enclosure and the rock cover is positioned thereon, ventilation of the interior of the enclosure 10 is necessary to prevent overheating. The covers 70 are preferably shaped so that multiple covers may be nested on top of each other during shipping or storage. Such a feature advantageously reduces expenses associated with shipping and storage of the covers 70.

Locking apertures 74 are located on opposite ends of the cover 70. The locations of the locking apertures 74 correspond to the locations of the apertures 64 on the extenders 57, so that when the cover 70 is placed over the housing 14, the locking apertures 74 on the cover 70 may be aligned with the apertures 64 on the extenders 57. Preferably, a user may align the apertures 64 and 74 by using the horizontal portion 66 of the alignment strip 60 as a reference for locating the position of the aperture 64. In the preferred embodiment, the horizontal portion 66 of the alignment strips 60 extends outward from the housing 14 a distance that is greater than the distance of the outer surface of the rock cover 70 when the rock cover 70 is positioned over the housing 14. Hence, the rock cover 70 can be easily aligned with the aperture 74 being positioned substantially adjacent the aperture 64 on the extender 57 by the installer as the alignment strips 60 are preferably visible even after the rock cover 70 is positioned over the housing 14. In this manner, the alignment strips 60 preferably allow a user to easily and quickly align the cover 70 over the housing 14.

In a preferred embodiment, locking pins 76 extend horizontally outward from the apertures 64 in the upper regions 58 of the extenders 57. The locking pins 76 may be fastened to the extenders 57 utilizing threaded ends on the locking pins 76 that are inserted through the apertures 64 and secured to the extenders 57 with a nut 77. The nut 77 in the preferred embodiment is a Nylock™ nut that receives the locking pin 76 to the extender 57 so that the locking pin 76 cannot be unscrewed from the outside of the cover 70 as the locking pin 76 will simply turn with the nut 77. Alternatively, the locking pins 76 may be integrally formed with the extender 57. A hole 78 extends radially through each of the locking pins 76 that is configured to receive a lock as described below.

The cover 70 is secured to the housing 14 by placing the cover 70 over the housing 70 and engaging one of the locking pins 76 through one of the locking apertures 74 in the housing 70. The cover 70 is then slid inward towards the housing 14 so that the opposite side of the cover 70 may rest on the ground. The cover 70 can then be slid back so that the locking pin 76 on the opposite end of the housing 14 may be inserted through the free locking aperture 74 in the cover 70. As discussed, the positions of the extenders 57 are adjustable along the slot 59, which allows a user to adjust the positions of the locking pins 78 to the size of the cover 70. It will be appreciated that since the extenders 57 are attached to the housing 14 via the slots 59, the extenders 57 can be adjustably mounted with respect to the housing 14. Consequently, the extenders 57 can be advantageously positioned so that the cover 70 can be mounted in a position wherein it is offset about the housing, e.g., closer to one side of the housing 14 than the other. It will be further appreciated in some circumstances, the position of the housing 14 is fixed, but it would be desirable to be able to mount the cover 70 closer to the housing 14 on one side than the other. Consequently, the locking pins 76 can be positioned so as to accommodate various positioning of the cover 70 with respect to the housing 14 while still allowing the cover 70 to be locked to the housing 14.

Once the two locking pins 76 are engaged through the locking apertures 74 in the housing, the locking pins 76 preferably extend outward from the apertures 74 a sufficient distance so that the holes 78 in the locking pins 76 are visible. Padlocks 80 may then be inserted through the holes 78 in the locking pins 76, thereby preventing the cover 70 from being removed from the locking pins 76. In this manner, the cover 70 and the contents within the cover are advantageously secured from theft or unauthorized removal.

In use, the utility cover apparatus 10 is located partially buried below ground so that the upper end 20 of the housing 14 protrudes upward from the ground. Preferably, the housing 14 is buried so that the horizontal portions 66 of the alignment strips 60 are level with the surface of the ground. The cover 70 may be secured in place in the manner described above so that the cover conceals the housing 14 from view. With the cover 70 in place, the utility connector enclosure appears as a rock sitting on the ground, rather than an intrusively-appearing plastic device. Hence, the device allows the use of utility connectors without the often unattractive appearance associated with prior devices.

Figure 3:
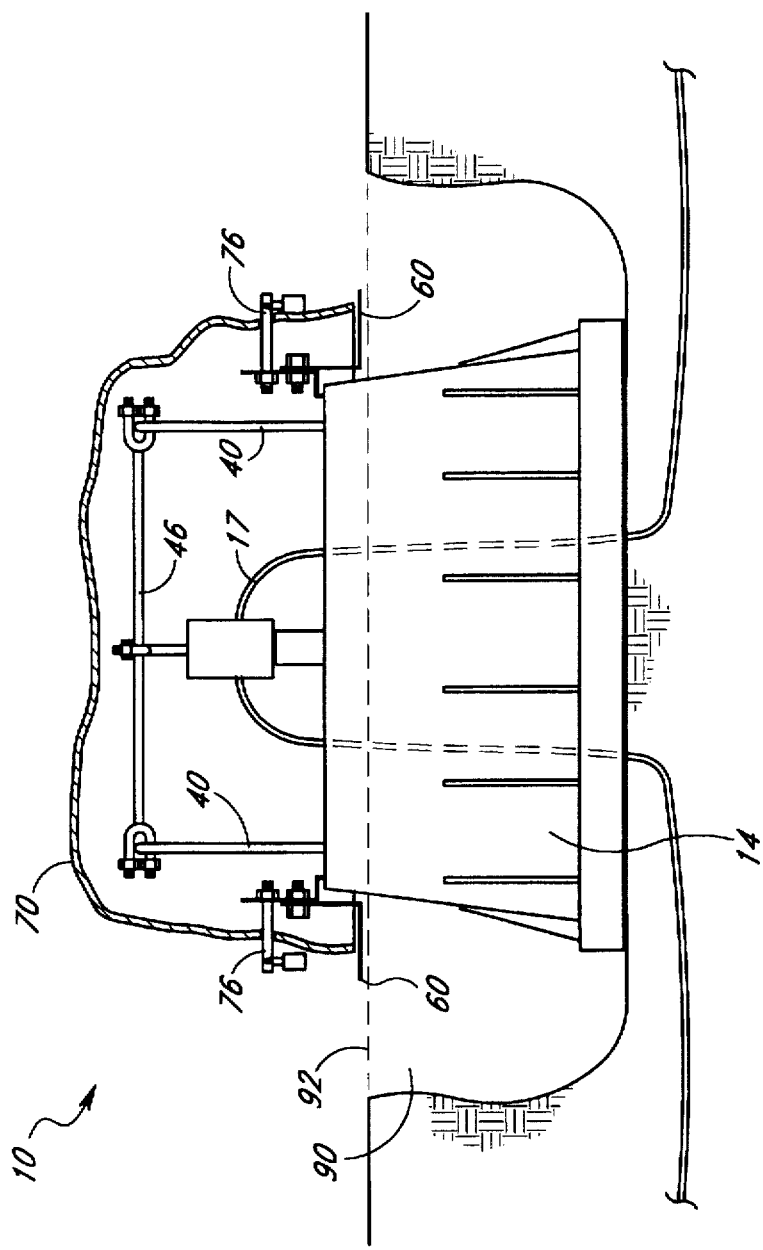
FIG. 3 is a side sectional view of the device of FIG. 1 as it is installed in the ground.

The installation of the housing 14 and the cover 70 will be described in greater detail in reference to FIG. 3. Specifically, in FIG. 3 a hole 90 is initially dug into the ground. The hole 90 is preferably dug to the level of the buried cables 17. The buried cables 17 are then pulled up into the enclosure 22 through the lower aperture 18. The device 47 is hung on the hanger rod 46 in a desired orientation and the cables 17 are then connected to the device 47. The installer then backfills the hole 90 to the level of the horizontal portions 66 of the alignment strips 60 that extend outward from the housing 14. As shown in FIG. 3, the horizontal portions 66 of the alignment strips 60 are positioned below the level of the upper aperture 22 so that an upper section 20 of the housing 14 is positioned between the level 92 of the ground and the cavity 18 of the housing 14. This reduces the likelihood of water seeping into the enclosure 14.

The rock cover 70 is then positioned over the housing 14 so that the rock cover completely covers the portion of the housing 14 protruding from the ground 92. As shown in the embodiment of FIG. 3, the alignment strip 66 extends outward from the housing 18 a distance greater than the rock cover 70, which facilitates alignment of the cover 70 with the locking pins 76, as the installer can always see the aperture 74 in the cover and the alignment strip 66 when positioning the cover on the ground 92. Once the cover 70 is positioned on the ground with the edges of the cover 70 resting on the horizontal portion 66 of the alignment strips 60, the operator may maneuver the cover 70 onto the locking pins 76 in the manner described above.

Hence, the rock utility cover apparatus 10 of the present invention provides certain advantages over the prior art. The practicality of the utility connector enclosure is enhanced, as maintenance personnel may position the hanger rod 46 at various positions during maintenance so as to provide better access to utility lines. Moreover, as the position of the center support 48 is adjustable, the center support 48 will not unnecessarily interfere with maintenance personnel and may be positioned to provide maximum support for an amplifier hanging from the hanger rod 46. The rock cover 70 provides an aesthetic look to a device that would otherwise appear unattractive in many environments. Further, the cover 70 may be easily and quickly locked in place utilizing the alignment strips 60, allowing utility personnel to secure the utility lines, as well as any devices attached to the lines, from theft or vandalism.

Although the preferred embodiment of the present invention has shown, described, and pointed out the fundamental novel features of the invention as applied to these embodiments, it will be understood that various omissions, substitutions, and changes in the form of the detail of the device illustrated, may be made by those skilled in the art without departing from the spirit of the present invention. Consequently, the scope of the invention should not be limited to the foregoing discussion, but is to be defined by the claims which follow.

What is claimed is:

1. A utility enclosure apparatus, comprising:

a housing, the housing having side walls defining a cavity therein, the housing having an upper aperture opening into said cavity and a lower aperture for the passage of utility cables therethrough into said cavity;

a first guide rail and a second guide rail, the first and second guide rails extending upward from the housing across the aperture and defining two substantially parallel planes that are spaced apart from each other;

a rod having a first end and a second end, the first end of the rod slidably connected to the first guide rail, the second end of the rod slidably connected to the second guide rail, wherein the rod is slidably movable along the lengths of the guide rails and wherein said rod is configured to receive one or more devices that are to be hung on said rod so as to support said one or more devices in an orientation where said one or more devices can be connected to said cables; and a cover having the appearance of a rock which is removably secured to said housing, wherein the cover is configured to fit over and conceal the housing.

2. The utility enclosure apparatus of claim 1, additionally comprising a center support bar removably connected to said housing and extending across the upper aperture, wherein both the vertical and horizontal position of the support bar is adjustable and wherein said center support can be positioned to support said one or more devices in a space positioned above a plane defined by said upper aperture of said housing.

3. The utility enclosure apparatus of claim 2, wherein a first aperture is located in said cover and a second aperture is located in said housing, and wherein the first aperture may be aligned with the second aperture for the insertion of a pin through said first and second apertures to secure said cover to said housing.

4. The utility enclosure apparatus of claim 1, additionally comprising an alignment strip extending outward from said housing, said alignment strip including a horizontal portion and a vertical portion, wherein a first aperture extends through said cover and a second aperture extends through said vertical portion of said alignment strip and wherein said first aperture may be aligned with said second aperture for the insertion of a pin through said first and second apertures to secure said cover to said housing.

5. The utility enclosure apparatus of claim 4, wherein said horizontal portion of said alignment strip is located along a common vertical plane with said second aperture so as to facilitate positioning of said cover on said housing so that said first and second apertures align.

6. The apparatus of claim 5, wherein the horizontal portion of the alignment strip extends outward from the housing a distance sufficient so that when the rock cover is positioned over said housing, said horizontal portion of said alignment strip is still visible to facilitate alignment of the aperture in said cover with the aperture in said housing.

7. The apparatus of claim 6, wherein the aperture in said housing is located in a spaced relationship to said alignment strip so that when said cover is positioned on said alignment strip, said first and second apertures are aligned and will receive a locking pin that will secure said cover on said housing.

8. The apparatus of claim 6, wherein said housing is configured to be partially buried in the ground and wherein the horizontal portion of the alignment strip defines the upper level of the ground to facilitate backfilling of a hole dug to receive the housing.

9. The apparatus of claim 8, wherein said horizontal portion of said alignment strip is spaced below a horizontal plane defined by said upper aperture of said housing so that said upper aperture is above ground level when said housing is partially buried in the ground.

10. The apparatus of claim 1, wherein said first and second guide rails are arched over said cavity and across said aperture.

11. The apparatus of claim 10, wherein the first and second ends of said rod are forked so as to be configured to receive the first and second guide rails.

12. A utility enclosure apparatus, comprising:
a rectangular-shaped housing having walls defining a cavity therein, the housing having an upper aperture opening into the cavity and a lower aperture opening into the cavity for the passage of underground utility cables through the lower aperture into the cavity;
a cover having an outer surface and an inner surface, the outer surface being configured to simulate the appearance of a rock, the inner surface defining a space sized to receive said housing;
an adjustable mounting rod mounted to the housing and configured to receive devices for attachment to said underground cables; and
means of removably securing said cover to said housing so that said cover conceals said housing from view.

13. The utility enclosure apparatus of claim 12, wherein a series of vents are located on said cover.

14. The utility enclosure apparatus of claim 13, wherein the vents comprise horizontal slots that are configured to act as a hand-hold for lifting the cover off of the housing.

15. The utility enclosure apparatus of claim 12, wherein the outer surface and the inner surface of the cover are sized so the cover may be nested over a like cover.

16. The utility enclosure apparatus of claim 12, wherein said mounting rod is slidably mounted above said cavity between two guide rails extending upward from said cavity.

17. The utility enclosure apparatus of claim 12, wherein the means of removably securing said cover to said housing includes an alignment strip extending outward from said housing, wherein a first aperture extends through said alignment strip and a second aperture extends through said housing and wherein the first aperture is configured to be aligned with the second aperture for the insertion of a pin through said first and second apertures.

18. The utility enclosure apparatus of claim 17, wherein the alignment strip includes a horizontal portion and a vertical portion above said horizontal portion, and wherein said first aperture extends through said vertical portion and wherein said horizontal portion is vertically aligned with said first aperture so that said horizontal portion may be used as a reference for determining the position of said first aperture when aligning said first and second apertures.

19. The utility enclosure apparatus of claim 18, wherein said cover has a bottom portion configured to rest against the ground, and wherein the outer surface of said bottom portion is spaced apart from said housing by a first distance when said cover is placed over said housing, and wherein said horizontal portion of said alignment strip extends outward from said housing a distance greater than said first distance so that said horizontal portion of said alignment strip is visible when said cover is placed over said housing.

20. The utility enclosure apparatus of claim 18, wherein said housing is configure to be partially buried in the ground and wherein the horizontal portion of the alignment strip defines the surface level of the ground when the housing is partially buried to facilitate backfilling of a hole dug to receive the housing.

21. The utility enclosure apparatus of claim 20, wherein said horizontal portion of said alignment strip is spaced below a plane defined by the upper aperture of the housing so that said upper aperture is above ground level when said housing is partially buried below ground.

* * * * *